United States Patent [19]

Lepain et al.

[11] Patent Number: 4,512,914

[45] Date of Patent: Apr. 23, 1985

[54] COMPOSITIONS AND METHOD FOR TREATING OIL SLICKS

[75] Inventors: Andre Lepain, Rosieres; Robert D. E. M. Bronchart, Brussels, both of Belgium

[73] Assignee: Labofina, S.A., Brussels, Belgium

[21] Appl. No.: 463,491

[22] Filed: Feb. 3, 1983

[51] Int. Cl.³ .............................................. B01F 17/02
[52] U.S. Cl. .................................... 252/355; 252/357
[58] Field of Search .................. 252/355, 357, 8.55 R, 252/8.55 D

[56] References Cited

U.S. PATENT DOCUMENTS

| | | | |
|---|---|---|---|
| 2,744,138 | 5/1956 | Marco et al. | 252/355 |
| 3,306,772 | 2/1967 | Erlander et al. | 252/357 |
| 3,308,161 | 3/1967 | Shen | 252/357 |
| 3,630,998 | 12/1971 | Schibler | 252/357 |
| 3,759,991 | 9/1973 | Marks | 252/355 |
| 4,152,290 | 5/1979 | Flournoy et al. | 252/355 |
| 4,162,989 | 7/1979 | Flournoy et al. | 252/355 |

FOREIGN PATENT DOCUMENTS 422461 1/1935 United Kingdom .............. 252/355

OTHER PUBLICATIONS

"Hackhs Chemical Dictionary", *Blakiston Co.*, 3rd. Edition, 1950.

*Primary Examiner*—Ben R. Padgett
*Assistant Examiner*—T. J. Wallen
*Attorney, Agent, or Firm*—Michael J. Caddell; John K. Abokhair

[57] ABSTRACT

Compositions for treating oil slicks on seawater said dispersing compositions containing at least one surface-active agent, at least one solvent, and a nitrogen-containing compound which is a nutrient for the microorganisms which are active in oil metabolism. The nitrogen-containing compound is a monoalkylguanidinium salt

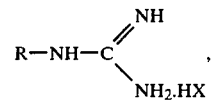

wherein R is an aliphatic hydrocarbon radical, saturated or unsaturated, containing from about 8 to about 20 carbon atoms, and X is a halogen or an acid anion.

10 Claims, No Drawings

COMPOSITIONS AND METHOD FOR TREATING OIL SLICKS

BACKGROUND OF THE INVENTION

The present invention discloses surface-active compositions for treating and dispersing oil slicks. This invention is also directed to a method for disposing of oil slicks.

Pollution of seawater by oil (crude oil or fractions of crude oil) occasioned by accidents, off-shore drilling operations, and/or discharge of ballast water or spillage from oil tankers, results in the formation of a continuous film or slick of oil which tends to continuously spread. In open seas, this oily film is undesirable because it constitutes a barrier to the transfer of air and light from the atmosphere into the seawater, which are indispensable to support marine life. In coastal waters, the oily film does damage to the crustacia beds and to the beaches.

One way of dealing with such pollution problems is to use oil dispersing compositions containing surface-active compounds. These compositions are applied on the oil slicks, generally by spraying means. They disintegrate the cohesive oily film into small droplets and disperse the droplets into the water column to a depth of several meters under the sea surface. The film is thus broken and there is again a transfer of air and light from the atmosphere. Moreover, fouling of the solid structures and beaches along the coasts is avoided.

The oil droplets which are dispersed under the sea surface are then biodegraded and consumed by micro-organisms which are living in seawater and are active in oil metabolism. This biological degradation is however a slow process and is consequently unable to prevent the settling of undegraded oil droplets and the formation of oil deposits on the floor of seas, more particularly where the water is shallow.

An active biodegradation of oil droplets needs the presence of a high amount of micro-organisms at the oil-water interface. However, these organisms are present in seawater in limited quantities. In order to stimulate the biodegradation, it is therefore necessary to speed up the proliferation of the micro-organisms. To this end, they need not only oxygen and carbon, which are present respectively in water and in polluting oils, but also nitrogen and phosphorous. Generally, the concentration of these latter two elements is very low in seawater and consequently the natural biodegradation of oil is a very slow process.

In order to increase the biodegradation rate, it has been proposed to add microbial nutrients to seawater. Mineral salts, such as ammonium salts, nitrates and phosphates, have been used. But these mineral salts are too water-soluble and have practically no affinity for the polluting oil. They are too quickly dissolved and dispersed into sea water and are not maintained at the oil-water interface where their presence is needed.

It has also been suggested to use nitrogen-containing organic nutrients which are oleosoluble, such as condensation products of urea or melamine with aldehydes. However, these organic compounds are also soluble in water. They dissociate from the oil and are dissipated into the aqueous phase. In order to overcome this disadvantage, it has been proposed to modify their solubility in water. For instance, condensation products of urea and an aldehyde containing less than four carbon atoms are first absorbed on an inert carrier and are then rendered lipophilic by coating with a paraffin or other protective colloid. These treatments require special equipment and they increase the cost of nutrients. Moreover, these latter cannot be suspended in the surface-active compositions which are used for the treatment of the oil slicks. Two separate applications, one for the surface-active composition and one for the nutrients, are therefore required. Furthermore, the coating might be quickly dissolved if the polluting oil, such as a fresh crude oil, contains aromatic hydrocarbons.

Other techniques have been suggested to reduce the solubility of the nutrients in water, but the result is compositions which only float on the water surface. These nutrients will not then promote the development of micro-organisms in the water column under the sea surface where the oil droplets are dispersed.

The difficulties encountered with prior art dispersants have been overcome by the development of new lipophilic nutrients for the micro-organisms which are present in sea waters and are active in oil degradation. These new nutrients achieve a rapid and more complete biodegradation of the oils, at low cost.

SUMMARY OF THE INVENTION

It is an object of this invention to provide liquid oil dispersing compositions containing a nutrient for micro-organisms comprising a nitrogen-containing compound which is poorly soluble in water and which is not subject to hydrolysis in water.

A further object of the invention is to provide oil dispersing compositions containing an oleophilic source of nitrogen.

It is also an object of this invention to provide oil dispersing compositions containing a nutrient and which exhibit a low toxicity towards aquatic flora and fauna.

Another object of the invention is to provide liquid oil dispersing compositions wherein the nitrogen-containing nutrient is easily dispersed.

It has now been found that compositions for treating oil slicks exhibit unexpected advantageous characteristics in terms of oil-dispersing efficiency and biodgradation by micro-organisms when a monoalkylguanidinium salt having the general formula

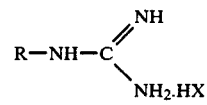

(wherein R is an aliphatic hydrocarbon radical, saturated or not, containing from about 8 to about 20 carbon atoms and X is a halogen or acid anion), is added to a dispersing mixture containing at least one surface-active agent and at least one solvent.

A composition according to the present invention for dispersing oil slicks into oil droplets and for promoting their biodegradation by micro-organisms comprises at least one surface-active agent which disintegrates the oil slick into oil droplets, at least one solvent and, as a source of oleophilic, nitrogen-containing nutrient, a mono-alkylquanidinium salt as hereinabove defined.

In accordance with another object of this invention, there is provided a method for dispersing oil slicks and for promoting their biodegradation by micro-organisms, comprising the step of applying a surface-active composition of the above-described type to the surface of the oil slick.

DESCRIPTION OF PREFERRED EMBODIMENTS

The compositions of the present invention comprise at least a surface-active agent, acting as dispersing agent, a mono-alkylguanidinium salt acting as nutrient, and at least one solvent, these compositions being liquid and easily sprayed by usual means.

According to one of their characteristics, these compositions contain, as an oleophilic source of nitrogen for micro-organisms, a mono-alkylguanidium salt having the general formula

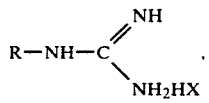

wherein R is an aliphatic hydrocarbon radical, (saturated, unsaturated, or partially saturated,) containing from about 8 to about 20 carbon atoms, and X is a halogen or acid anion.

The monoalkylguanidinium salts are easily prepared by a known method which consists in reacting cyanamid ($H_2H-C\equiv N$) with a salt of primary amine ($R-NH_2.HX$, wherein R and X are as above mentioned). Mixtures of amine salts may also be used. After purification, the resultant products are monoalkylguanidinium salts having a nitrogen content which depends on the specific R and X, but which is generally at about 6.5 to about 25%.

The radicals R and X are selected in order to obtain monoalkylguanidinium salts which are poorly soluble in water, are lipophilic, are soluble or at least easily disperesed into the solvents contained in the compositions used for treating oil slicks, and are stable towards these solvents and water. For these reasons, monoalkylguanidinium salts wherein the radical R contains from about 8 to about 20, and more particularly between about 12 and 18 carbon atoms, are preferably used. On the other hand, X is generally a halogen, particularly Cl, or an acid anion, such as $CH_3SO_4$, $C_2H_5SO_4$, $NO_3$, $HSO_4$,

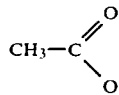

or $R^1$-$CH_6H_4SO_3$, wherein $R^1$ is H or an alkyl radical having between 1 and about 12 carbon atoms. For economic reasons, monoalkylguanidium salts wherein X is Cl, $HSO_4$ or $NO_3$, are preferable.

In order to promote the development of micro-organisms at the oil-water interface, the monoalkylguanidinium salts, acting as source of nitrogen, are advantageously employed in admixture with a phosphorous compound, acting also as a nutrient to supply phosphorous. The phosphorous compound may be an alkaline or alkaline-earth salt of phosphoric ester of fatty alcohol, a salt or an ester of organophosphonic acid, or a phosphatide or similar product having a low toxicity towards aquatic flora and fauna. Esters obtained by neutralization of hexamethylene diamine tetra(methylene phosphonic acid) having the formula ($H_2PO_3CH_2$-$)_2$—$H(CH_2)_6$—$N(CH_2PO_3H_2)_2$), with an amine, such as monoethanolamine or a fatty amine containing from 12 to 18 carbon atoms, give good results. Phosphatides or phospholipids, more particularly lecithin or kephaline, act at the same time as a source of nitrogen and phosphorous, and thus they reinforce the action of the monoalkylguanidinium salts.

The compositions of the present invention comprise at least one surface-active agent having a low toxicity towards aquatic flaura and fauna. Preferable surface-active agents include ethoxylated tall oil, mono- and polyesters of polyhydroxylic alcohols, and more particularly, the esters of saturated or unsaturated aliphatic carboxylic acids containing from 12 to 20 carbon atoms, and of alcohols, such as sorbitane, glycerol and polyehtyleneglycol. Mixtures of two or more of these esters may be used, with the optional addition of other surface-active agents, such as ethoxylated fatty alcohols, alkaline salts of dialkyl sulphosuccinates or condensation products of ethylene oxide and/or propylene oxide on the above-mentioned esters.

The liquid compositions of the invention are prepared by dissolving the active components into a solvent or a mixture of solvents having a low toxicity towards aquatic flora and fauna. Preferable solvents include the liquid hydrocarbons containing less than about 5%, and preferably less than 3% of aromatic compounds, and more particularly liquid hydrocarbons containing from 5 to 20 carbon atoms, such as paraffinic hydrocarbons containing from 6 to 12 carbon atoms, cycloparaffinic hydrocarbons such as cyclopentane and cyclohexane, alkylcycloparaffinic hydrocarbons and napthenic hydrocarbons. Aliphatic alcohols containing up to 8 carbon atoms, such as ethyl-, propyl- and isopropyl alcohols, and glycol monoethers, more particularly monoalkylethers (where the alkyl radical contains from 1 to 4 carbon atoms) of glycols such as mono- or diethyleneglycol and mono- or di-propyleneglycol, are also suitable solvents. The organic solvent may also contain water in an amount which does not exceed the amount of organic solvent and which is generally between about 10 and 50%, based on the weight of the organic solvent.

The solvent has a double action: it facilitates the handling and the application of the surface-active agents, and moreover, due to its affinity, it promotes the penetration of the composition into the oil film. It is therefore advantageous to use compositions wherein the amount of water (if present) does not exceed about 25% of the total amount of organic solvent and water.

The weight ratio of surface-active agents to solvent may vary between wide limits. It is of course desirable to employ compositions which are as concentrated as possible, but the amount of solvent in composition must be sufficient to dissolve the surface-active agents and nutrients and also allow the application of the composition at low temperatures. It has been found that compositions containing more than about 85% of surface-active agents and nutrients are too viscous at low temperatures. Moreover they do not easily penetrate into the oil slick and are therefore less active. On the other hand, compositions containing less than about 30% of surface-active agents and nutrients have a low effectiveness.

The amount of monoalkylguanidinium salt in the compositions of this invention may vary between relatively wide limits and may be as high as 35% or even more, based on the total weight of composition. This amount depends upon many factors, including the specific guanidinium salt used and its nitrogen content, the optional presence of other nutrients, and the specific solvent used. Compositions containing from about 2 to 20 wt %, and more particularly from about 5 to about 15 wt %, of monoalkylguanidinium salt are very effective with respect to the biodegradation of oil droplets dispersed in seawater.

The compositions of the present invention may also contain other components and elements such as magnesium and calcium which are useful for the development of micro-organisms. The compositions contain these elements in the form of organic salts, namely in the form of a magnesium or calcium salt of alkylbenzenesulphonic acid. The amount of these additives does not generally exceed about 3%, based on the total weight of the composition.

The compositions are applied to the oil slicks by using any known method. They may be used without water or after dilution by water. They may be sprayed on the oil slicks from aircraft or from boats which are provided with suitable spraying means.

The present compositions meet current specifications relating to dispersants for treating oil spills, including the tests for toxicity, dispersing effectiveness, and biodegradation.

The toxicity test consists in subjecting a particular live species, such as Artemia Salina, to increasing doses of the composition to determine the maximum amount of composition which, after 24 hours, will still leave 50% of the tested species alive (test CL 50-24 hours).

Dispersing effectiveness is determined by the MIL method, which consists in pouring 100 cc of crude oil into a vessel containing 133 liters of water, adding thereafter, 100 cc of a 10% aqueous solution of the composition. This is allowed to set for 90 seconds. The mixture is then stirred for 10 minutes to disperse the oil. Samples of the dispersion are withdrawn and the oil contained in these samples is extracted. The dispersing effectiveness is given by the percentage of extracted oil vs the total amount of dispersed oil.

Biodegradation effectiveness is determined by the following method: 200 ppm of the tested composition are added to unsterilized sea water (700 ml) containing topped crude oil (500 ppm). This is left to incubate for 41 days at 25° C., while being stirred by air bubling. The residual is then extracted.

Results of these tests are given in the following examples.

EXAMPLE 1

Monododecylguanidinium chloride was prepared by a known process from dodecylamine hydrochloride and cyanamid.

A dispersing composition was then prepared containing (parts by weight):
13 parts sorbitol monolaurate
47 parts polyethyleneglycol monooleate (molecular weight of the glycol: 400),
15 parts ethyleneglycol monobutylether,
5 parts water
15 parts monododecylguanidinium chloride,
5 parts hexamethylenediaminotetra(methylenephosphonic acid)ethanolamine ester,
dodecylamine ester.

This composition had the following characteristics:
toxicity (ppm)
  daphnia magna: 850 ppm
  artemia salina: 1000 ppm
dispersing effectiveness (%): 72
biodegradation: 2.4 times higher than a similar composition containing no guanidinium salt or phosphorous compound.

EXAMPLE 2

A composition was prepared as in Example 1, but by using a guanidinium salt prepared from a mixture of primary $C_{12-18}$ amine hydrochlorides.

The characteristics of this composition, with respect to toxicity, dispersing effectiveness and biodegradation, were the same as the characteristics of the composition of Example 1.

EXAMPLE 3

Monodecylguanidinium nitrate was prepared by a conventional process from decylamine nitrate and cyanamid.

A dispersing composition was then prepared containing (parts by weight):
16.75 parts sorbitol monooleate,
13.50 parts ethoxylated sorbitol monooleate (about 20 moles of ethylene oxide)
24 parts sodium salt of di-(2-ethylhexyl)sulfosuccinate (a 75% aqueous solution),
11.25 parts water
12 parts ethyleneglycol monobutyl ether,
2.5 parts diethyleneglycol,
15 parts monodecylguanidinium nitrate,
5 parts hexamethylenediaminotetra(methylenephosphonic acid)ethanolamine ester The biodegradation rate with this composition was 1.8 times higher than with a similar, but nutrient-free composition.

EXAMPLE 4

A dispersing composition was prepared as described in Example 1, but by using monododecylguanidinium acetate, prepared from dodecylamine acetate and cyanamid, as guanidinium salt. The biodegradation rate with this composition was 2 times higher than with a similar, but nutrient-free composition.

EXAMPLE 5

For this example, 9-octodecenylguanidinium choloride having the formula:

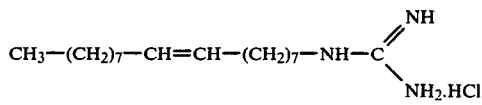

was prepared from 9-octadecenylamine hydrochloride and cyanimid.

A dispersing composition was then prepared containing (parts by weight):
6.2 parts sorbitan monolaurate,
21 parts polyethyleneglycol monooleate (mixture of glycols having molecular weights of 200 and 400),
45.5 parts diethyleneglycol monobutylether,
8.3 parts water,
12 parts of the above guanidinium salt,
7 parts lecithin Said composition was 1.8 times more active, with respect to the biodegradation process, than a similar composition that was nutrient-free.

What is claimed is:

1. Dispersing compositions for treating oil slicks on seawater, comprising at least one surface-active agent, at least one solvent, and a monoalkylguanidinium salt having the general formula

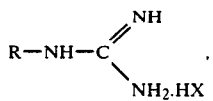

wherein R is an aliphatic hydrocarbon radical containing from about 8 to about 20 carbon atoms, and X is a halogen or an acid anion.

2. Compositions according to claim 1 wherein R is an aliphathic hydrocarbon radical containing from about 12 to about 18 carbon atoms.

3. Compositions according to claim 1, wherein X is an acid anion selected from the group comprising Cl, —CH$_3$SO$_4$, —NO$_3$, —HSO$_4$,

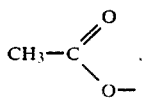

and R$^1$—C$_6$H$_4$SO$_3$; and wherein R$^1$ is H or an alkyl radical containing from 1 to 12 carbon atoms.

4. Compositions according to claim 1 wherein X is Cl, —NO$_3$ or —HSO$_4$.

5. Compositions according to claim 1, containing up to 35% of monoalkylguanidinium salt, based on the total weight of composition.

6. Compositions according to claim 5, containing from about 2 to about 20% of monoalkylguanidinium salt, based on the total weight of composition.

7. Compositions according to claim 6, containing from about 5 to about 15% of monoalkylguanidinium salt, based on the total weight of composition.

8. Compositions according to claim 5, further comprising a phosphorous compound acting as a nutrient for micro-organisms.

9. Compositions according to claim 8, wherein the total weight of surface-active agent, monoalkylguanidinium salt, and phosphorous compound is between about 30 and about 85 percent, based on the total weight of the composition.

10. Compositions according to claim 9, further comprising an alkylbenzenesulfonic acid magnesium salt or calcium salt in an amount not higher than about 3%, based on the total weight of composition.

* * * * *